United States Patent [19]

Marino et al.

[11] Patent Number: 5,055,156

[45] Date of Patent: Oct. 8, 1991

[54] FLOORING PANEL MANUFACTURE

[75] Inventors: Vincent J. Marino, Cooper City, Fla.; John V. Marino, II., Beverly Farms, Mass.

[73] Assignee: Flex Par K Corp., Essex, Mass.

[21] Appl. No.: 383,864

[22] Filed: Jul. 21, 1989

[51] Int. Cl.[5] ........................ B32B 31/00; B65H 29/00

[52] U.S. Cl. .................................... 156/499; 156/556; 156/557; 156/559; 156/578; 156/322

[58] Field of Search ............... 156/556, 557, 558, 559, 156/578, 499, 271, 320, 322; 118/429, 407, 410

[56] References Cited

U.S. PATENT DOCUMENTS 3,607,544 9/1971 Earner et al. .................. 156/320 X 4,069,087 1/1978 Luke et al. ...................... 156/578 X 4,360,992 11/1982 Marino .

4,512,840 4/1985 Marino .

*Primary Examiner*—David A. Simmons

*Assistant Examiner*—Jeffrey G. Payne

*Attorney, Agent, or Firm*—Henry D. Pahl, Jr.

[57] ABSTRACT

Rows of wood fillets are assembled into panels by stepwise advancing the rows through two stages of wedge-shaped heating and gluing blocks where the edges of the fillets are pre-heated and then coated with a hot melt adhesive before being brought together with a strip of polyethylene foam between the edges of the fillets. The first stage assembles selected groups of the rows and the second stage joins the several groups so that the entire assemblage is accomplished over a relatively short distance and time. The resultant assembly exhibits improved flexibility and cohesiveness.

5 Claims, 4 Drawing Sheets

FLOORING PANEL MANUFACTURE

BACKGROUND OF THE INVENTION

The present invention relates to a method and apparatus for assembling flexible flooring panels and, more particularly, to such a method and apparatus which produces a superior product at lower cost and in a more compact machine.

The method and apparatus disclosed herein are improvements on the method and apparatus disclosed and claimed in U.S. Letters Pat. No. 4,512,840, issued Apr. 23, 1985, to Vincent J. Marino. Similarly, the product produced by the method and apparatus of the invention is an improvement of that disclosed in U.S. Letters Pat. No. 4,360,992, issued Nov. 30, 1982, to Vincent J. Marino.

As is disclosed in the aforementioned patents, a dimensionally stable flooring panel may be manufactured by assembling rows of wood fillets with a foam spacer being interposed between the adjacent rows. The foam spacer accommodates dimensional changes in the wood making up the fillets, caused by either changes in temperature and humidity, and by doing so inhibits buckling of the floor panel.

The apparatus disclosed in the '840 patent built up a panel by initially joining together the innermost rows and then adding rows in succession to either side as the fillets advance through the apparatus. The rows were advanced step-wise one fillet length at a time and a solvent based adhesive was employed to bond the fillets to the foam strips. While a useful product was produced, the overall length of the machine was considerable due to the large number of gluing stages which had to be traversed and by the need to provide a long curing stage, where the adhesive could be sufficiently cured to permit subsequent handling and finishing of the assembled panels.

Among the several objects of the present invention may be noted the provision of apparatus for assembling an improved flooring panel; the provision of such apparatus which is of substantially reduced length as compared with prior art systems; the provision of such apparatus which advances the rows of fillets being assembled in substantially longer increments, as compared with prior art systems; the provision of such apparatus which is highly reliable and which is of relatively simple and inexpensive construction; and the provision of flooring panel which exhibits improved flexibility and which incorporates a stronger edge bond between the wood fillets making up the panel and a foam tape providing for expansion of the fillets. Other objects and features will be in part apparent and in part pointed out hereafter.

SUMMARY OF THE INVENTION

In accordance with the practice of the present invention, rows of wood fillets are periodically advanced step-wise for a distance which is a multiple of the length of each fillet. Fillets pass through first and second stages of wedge-shaped heating and gluing blocks, the length of each heater block being at least twice the length of a fillet, thereby to pre-heat the edges of the fillets pressing against the block. The block includes a glue port adjacent its trailing end though which hot melt adhesive is applied to the heated edge of the fillets. A foam strip is introduced between the respective rows of fillets at a point closely following the trailing edge of each block.

In accordance with another aspect of the invention, the first stage of heating and gluing of the blocks assembles sub-groups of the rows and the second stage joins the groups to each other, thereby to effect complete assembling of the panel over a relatively short path.

In accordance with a still further aspect of the present invention, the fillets are advanced by means of a pusher plate which is slidable in the direction of feed and is reciprocated over a distance corresponding to a multiple of the length of each fillet. A series of raised pusher bars mounted on the plate are operative during a forward stroke of the pusher plate to advance a set of fillets. Fillets are fed frictionally onto the pusher plate at a level slightly above the pusher bars and a means, operative at the completion of a return stroke of the pusher plate, drives a next set of fillets down into the path of the pusher bars.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
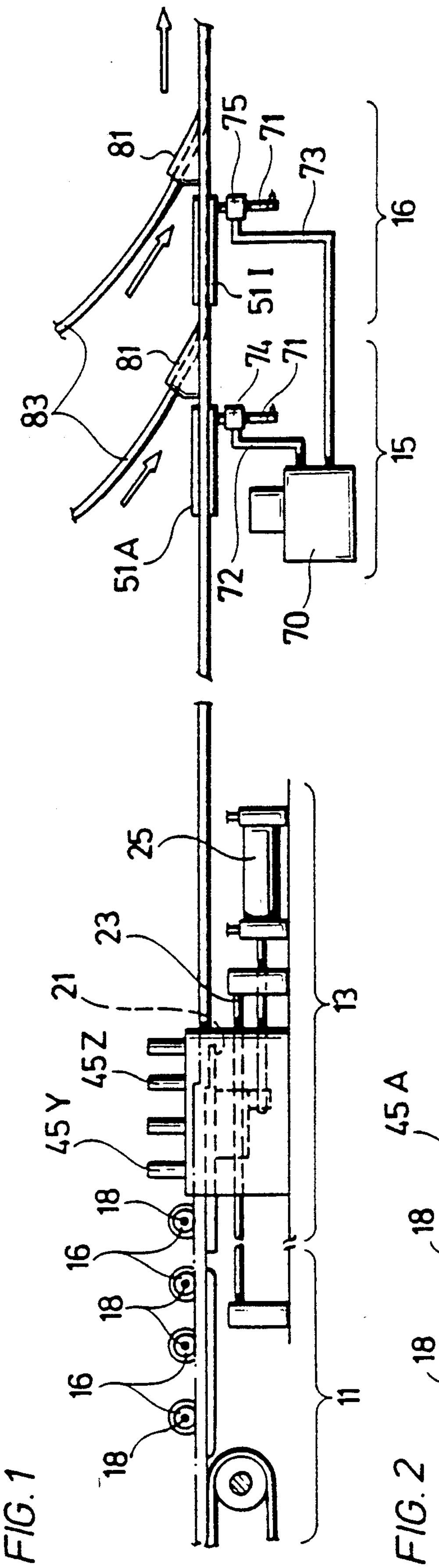
FIG. 1 is a diagrammatic side view showing apparatus for assembling wood fillets into flooring panels in accordance with the practice of the present invention.
Figure 2:
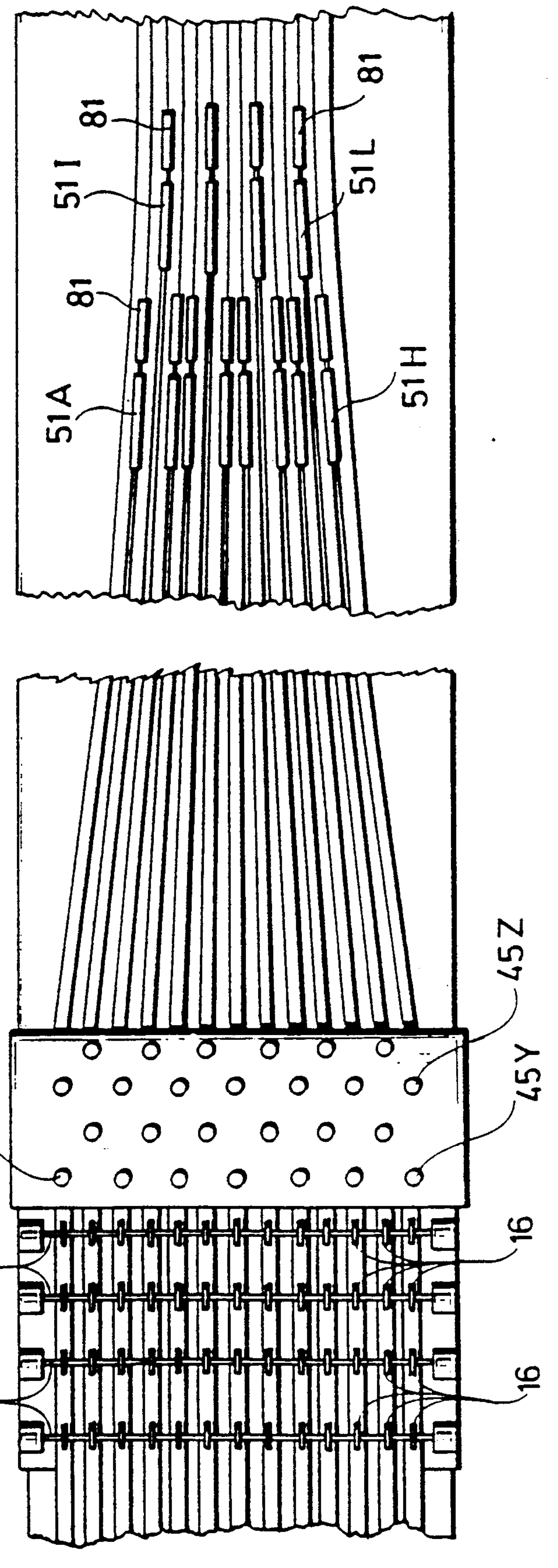
FIG. 2 is a diagrammatic plan view of the apparatus of FIG. 1.

Referring now to FIGS. 1 and 2, the overall apparatus illustrated there may be considered as comprising three different sections, these being a (frictional) feeding section 11, a positive step-wise feed mechanism 13, and a pair of joining sections 15 and 16. The feeding section 11 is operative to frictionally feed rows of wood fillets to the pusher section 13 and is essentially the same as the corresponding portion of the apparatus shown in the previously identified '840 patent. In the feeding section 11, as well as in the first portion of the step-wise feed mechanism, the row of fillets are prevented from buckling upwards by wheels 16 mounted on axles 18.

In FIG. 1 only the rows of fillets have been shown and the guides which constrain their paths have been omitted so as not to obscure the drawing with unnecessary detail. In the embodiment illustrated, thirteen rows of fillets are brought together to form a panel. The individual fillets may, for example, be six inches long, fifteen sixteenths of an inch wide, and five sixteenths of an inch thick.

As indicated previously, a feature of the apparatus of the present invention is that the wood fillets are advanced step-wise in steps which are a multiple of the length of the fillets, by means of a pusher plate which reciprocates under the rows of the fillets. In FIG. 1, this pusher plate is designated generally by reference character 21 and is mounted so as to be slidable in the direction of feed on guides 23 under the bed of the apparatus, the bed being designated by reference character 38. The pusher plate can be reciprocated over a distance corresponding to a multiple of the length of each fillet by an air cylinder 25. In the embodiment illustrated, the length of advance is twice the length of a fillet. The stroke of the cylinder is preferably slightly greater than this distance so as to provide some clearance for the fillets about to be dropped into place, as described hereinafter.

Figure 3:
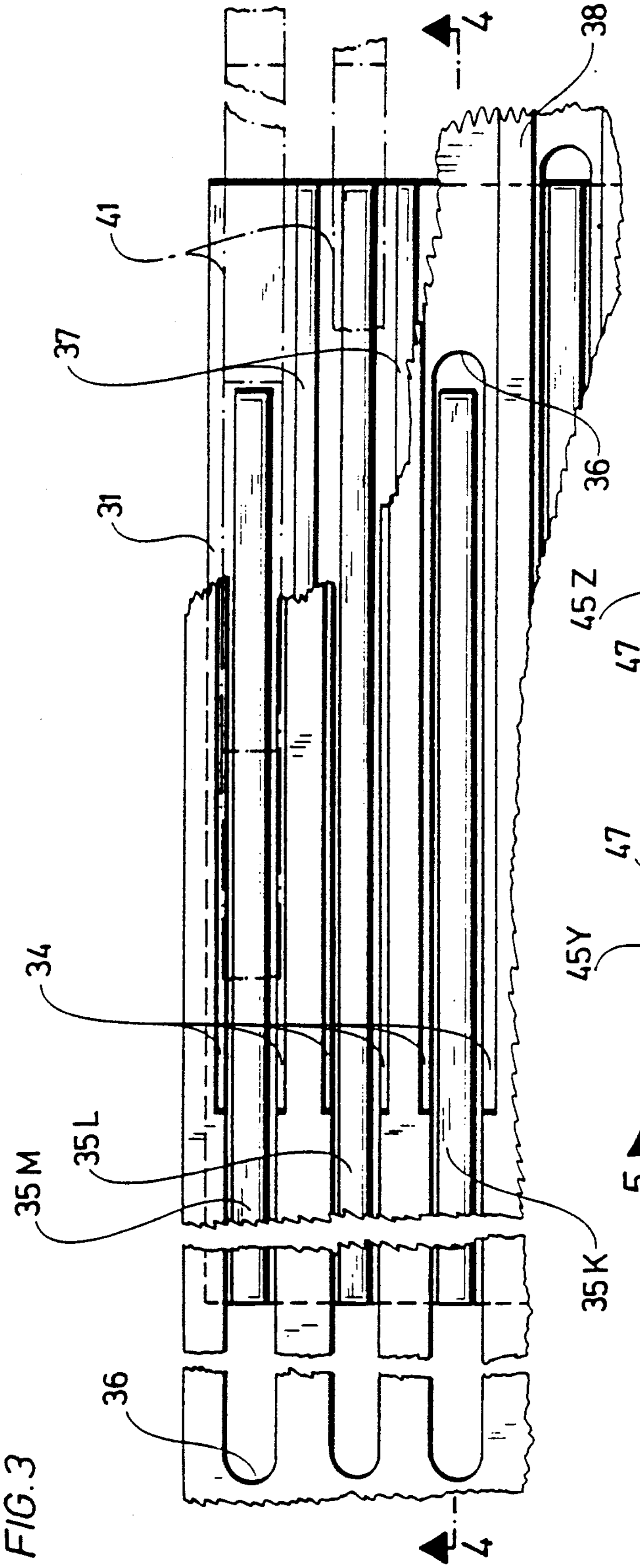
FIG. 3 is a plan view of a pusher plate mechanism employed in the apparatus of FIGS. 1 and 2 for advancing rows of wood fillets.
Figure 4:
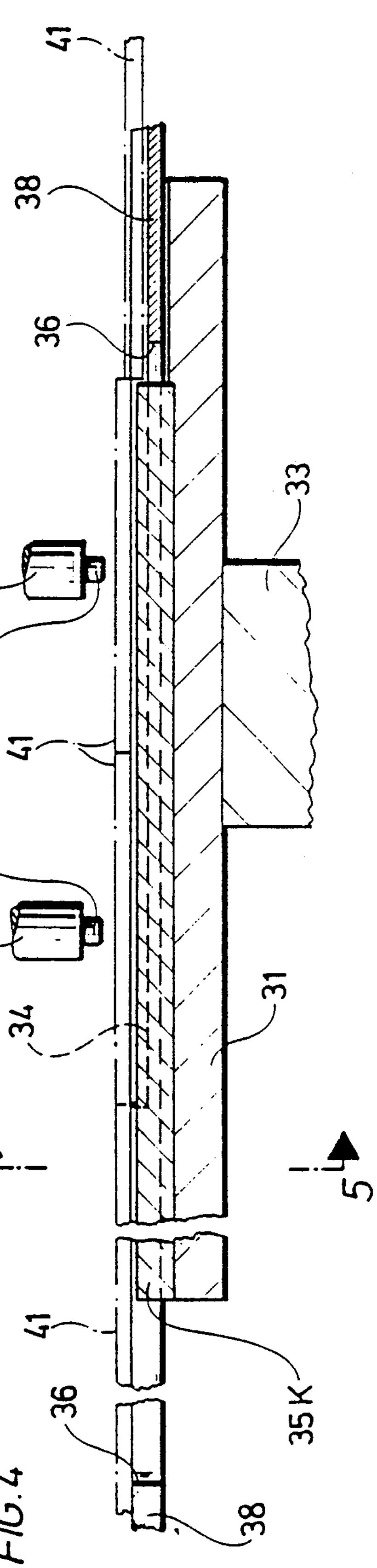
FIG. 4 is a sectional view, taken substantially on the line 4—4 of FIG. 3 of the pusher plate assembly of FIG. 3.
Figure 5:
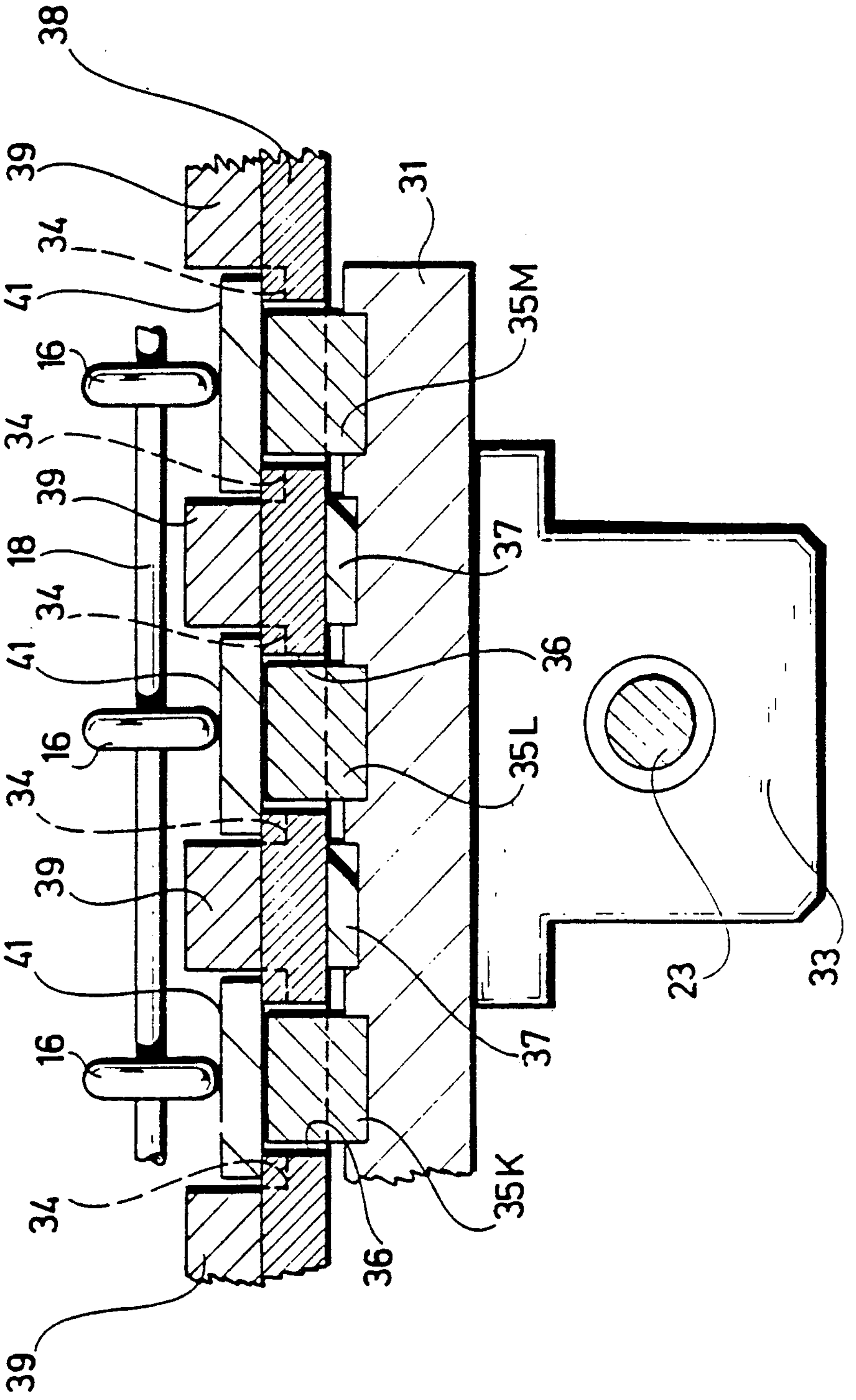
FIG. 5 is a sectional view, taken substantially on the line 5—5 of the pusher plate assembly of FIG. 4.

The construction of the pusher plate is illustrated in somewhat greater detail in FIGS. 3-5. The pusher plate comprises a flat base 31 which is journaled on the guides 23 by means of bearing blocks 33. Friction between the base 31 and the bed 38 is reduced by low friction plastic slide strips 37. Set into the upper face of the base 31 are a succession of pusher bars 35A-35M, one for each row of fillets. The pusher bars are staggered in the direction of feed by approximately half the length of a fillet. The pusher bars extend up through slots 36 cut into the bed of the machine 38.

As illustrated in FIGS. 4 and 5, the incoming rows of fillets, designated generally by reference character 41, are fed by the frictional feed 11 over the bed 38 to the pusher plate mechanism 13 at a height just above the pusher bars. Alignment of the rows is maintained by guides 39. When the pusher plate has completed a forward stroke, the position illustrated in FIG. 4, it then returns to its left most or retracted position. As the pusher plate reaches its retracted position, a plurality of air cylinders 45A-45Z are energized to drive down respective plungers 47 which engage the next set of fillets and force them down into grooves 34 cut into the bed 38 so that the fillets are aligned with and may be appropriately engaged by the pusher bars 35A-35M. Because of the end-wise force developed by the feeding system 11, the frictional pressure between successive fillets would prevent the incoming fillets from merely dropping under the influence of gravity. In the embodiment illustrated, there is one such air cylinder for each fillet in the set to be advanced, i.e., 26 such cylinders.

The height of the pusher bars above the bottoms of the grooves 34 is substantially less than the thickness of the fillets, e.g., approximately one eighth of an inch. Accordingly, when one set or group of the fillets are advanced by the pusher plate, the incoming rows of fillets will follow along behind, propelled by the frictional driving force.

As indicated previously, the apparatus of the present invention effects assembling of the several rows of fillets in just two gluing stages. In the first stage, the rows are joined together in groups and, in the second stage, the groups are joined to each other. In the embodiment illustrated in FIG. 2, the first stage assembles a central group of three, a group of three on each side of the central group and a group of two as the outermost grouping on each side. As will be understood, a grouping of two rows will be more flexible than a grouping of three rows and the path of the outside groupings necessarily involves traversing a greater curvature than the path of the rows. The second stage then assembles the five groups.

In each stage, each row of fillets which is to be glued passes by a wedge-shaped heating and gluing block which preheats the edge of each fillet to be joined and applies hot melt glue to the heated edge. In FIG. 2, the heating and gluing blocks in the first stage are designated by reference characters 51A-51H. The leftmost two rows pass by and are treated by the block 51A, the next three rows pass by and are treated by the blocks 51B and 51C, and so on. The heating and gluing bocks in the second stage are designated by reference characters 51I-51L and, as indicated previously, these elements operate to treat the fillet edges of the respective groups of rows which are to be joined in the second stage.

Hot melt glue is provided under pressure from a pump and reservoir unit 70 through heated hoses 72 and 73 to heated manifolds 74 and 75 which are coupled to the various heating and gluing blocks, as described in greater detail hereinafter. Suitable hoses and the reservoir and pump unit may, for example, be obtained from Mercer Corp. of Hendersonville, Tennessee. A suitable hot melt adhesive is S314-559, obtainable from the Bostik Chemical Division of the Emhart Corporation of Middleton, Massachusetts.

Figure 6:
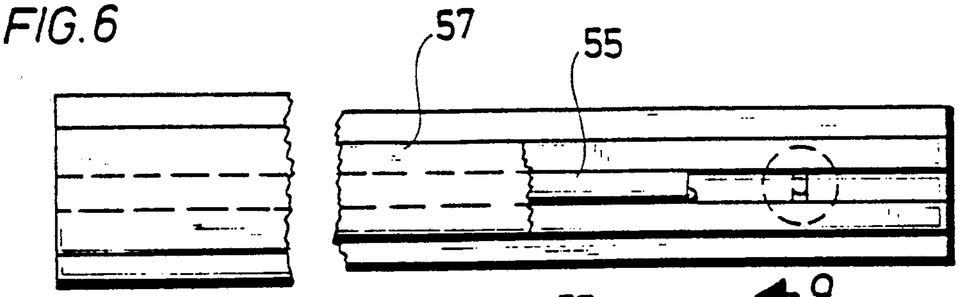
FIG. 6 is a top view of a wedge-shaped heating and gluing block employed in the apparatus FIGS. 1 and 2.
Figure 7:
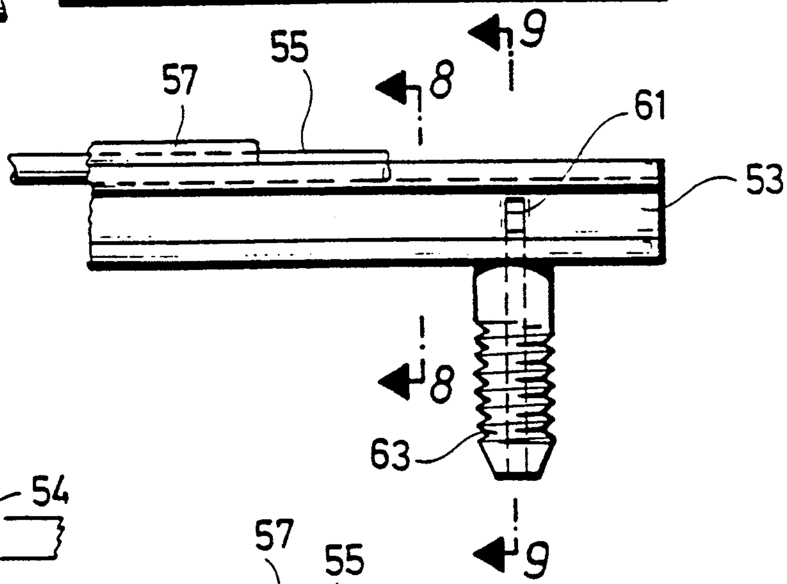
FIG. 7 is a side view of the heating block of FIG. 6.
Figure 8:
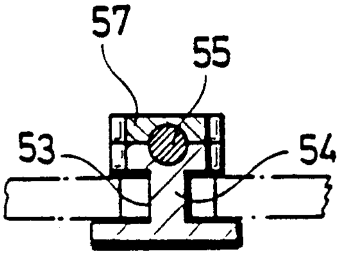
FIG. 8 is a sectional view taken substantially on lines 8—8 of FIG. 7.

As may be seen in FIG. 6, each heating and gluing block is tapered so that the respective rows of flow of fillets follow paths which converge somewhat downstream of the heating and gluing block. As may be seen in FIG. 8, the block 51 has a groove on either side (designated 53 and 54), for receiving the edges of the respective rows of fillets. A rod-like heater element 55 extends the length of the heater block and is covered by a cap 57. A thermistor (not shown) is also mounted under the cap for sensing the temperature of the heater block, so that its temperature may be regulated by a suitable proportional controller.

The length of the heater and gluing block 51 corresponds to the amount by which each row is fed during one cycle of the pusher mechanism 13. For example, in the embodiment illustrated, the heater blocks 51 are twelve and one half inches long. Thus, the edges of the fillets about to be fed out of the heating and gluing assembly during each step-wise advance will be preheated between the steps. Accordingly, hot melted glue applied to the edges of the fillets, as they leave the heating and gluing assembly, will not cool excessively prior to the fillets being brought together with the foam strip between them.

Figure 9:
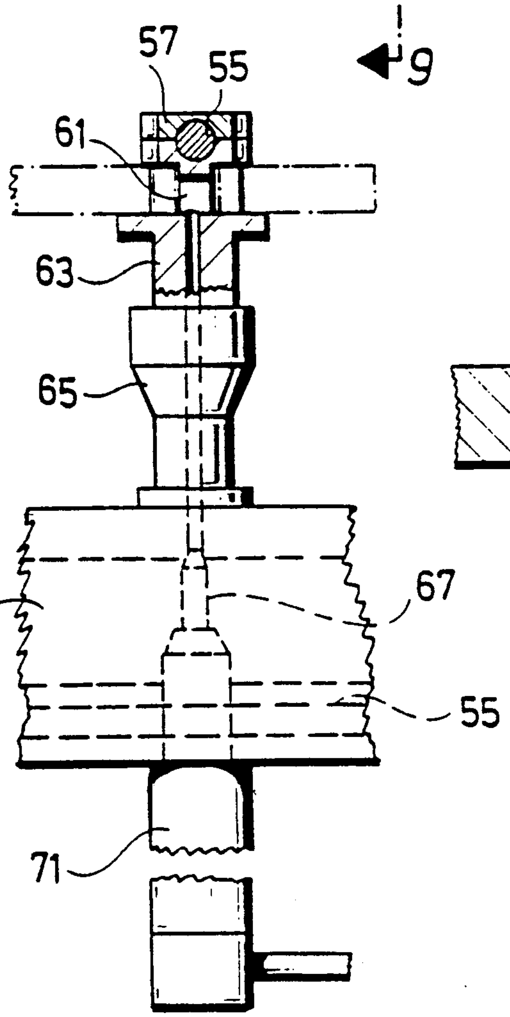
FIG. 9 is a sectional view taken substantially on the line 9—9 of FIG. 7, showing a glue port incorporated in the block together with a glue manifold and valving assembly used in connection therewith.
Figure 10:
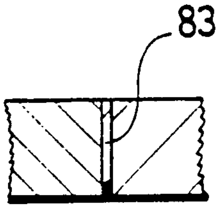
FIG. 10 illustrates the joining of wood fillets in accordance with the method of the present invention.

As illustrated in FIG. 9, each heating and gluing block 51 provides, near its trailing end, a glue port 61 opening into each of the channels 53 and 54 for applying glue to the edges of the fillets passing the block. Hot melt glue is fed to port 61 through a nipple 63 which is connected, through a coupling 65, to a respective manifold structure 74 or 75. The manifold structures are also provided with heaters to keep the adhesive in a suitably fluid condition. The ports exiting the manifold to each heating and gluing block can be blocked by a valving element 67, which can be advanced or withdrawn by a pneumatic cylinder 71. In order to prevent bleeding of glue out of the ports 61 while the fillets are not moving, the cylinders 71 are actuated to open the valves only when the pusher cylinder 25 is making its forward, or advancing, stroke.

As will be understood, the apparatus of the present invention may easily be adapted to assemble flooring panels of different thicknesses merely by changing the heating and gluing block assemblies to correspond to the desired thickness, and by adjusting the spacing under the hold down wheels 16. Immediately following each heating and gluing block is a guide 81 for leading a polyethelene foam tape or strip 83 into the gap between the respective rows of fillets before they converge. The thickness of the strip is preferably about 1/32 inch. The foam tape is drawn from the suitable reel (not shown) which is not driven. Rather, the tape is merely drawn out by being pulled by the advancing rows of wood fillets. As each pair of rows comes together, the still hot adhesive will bond the edges of the fillets to the corresponding face of the tape and, through the tape, the fillets will be bonded to each other. In accordance with one important aspect of the present invention, it has been found that, by using a hot melt adhesive, an exceptionally strong bond ca be obtained between the wood fillets and the polyethelene of the tape, polyethelene being notoriously difficult to bond to using the usual solvent based adhesives as described in the previously identified '992 patent. Further, since the hot melt adhesive does not fill the foam, a high degree of flexibility is imparted to the resultant panel.

As indicated previously, an important aspect of the present invention is the recognition that the bonds produced by the method and apparatus of the present invention are sufficiently strong and flexible to allow the rows of fillets to be joined in groups in a first stage with the groups then being joined to each other in a second stage, so that only a quite compact or short joining region is required. Further, since the process of the present invention employs a hot melt adhesive which sets up relatively quickly and does not require drying, the product is essentially immediately ready for further processing, such as top-surface sanding, and no bulky curing oven is required. Further, since multiple lengths of fillets are advanced through the joining area on each cycle of the pusher mechanism, it will be understood that an increased through-put, or increased efficiency, is obtained.

While the apparatus as illustrated facilitates the making of panels of a particular width, it is also flexible in the sense that multiple panels of narrower width can also be made by merely turning off the flow of glue to one or more of the heating and gluing blocks so that the corresponding grouping of rows may be easily separated after they exit the machine.

With regard to the product produced in accordance with the present invention, it has been found that the improved bonding obtained gives the resultant panel greater integrity and cohesiveness so that it may be more easily handled and can be provided with a finish even before installation. Further, the resultant panel has improved flexibility so that it may be installed over relatively uneven substrates or over a cushioning layer.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for assembling rows of wood fillets into panels, said apparatus comprising:

feeder means for periodically advancing said rows step-wise, the fillets in adjacent rows being staggered lengthwise;

a first stage of wedge-shaped heater and gluing blocks, the blocks being transversally tapered along the direction of feed, the blocks being interposed between selected rows of said fillets with the fillets pressing laterally against the blocks, the length of each said heater being at least the length of a fillet thereby to pre-heat the edges of fillets pressing against the block, said blocks having a glue port adjacent the trailing end of each side through which hot melt adhesive is applied to heated edges of fillets being driven past the block;

means for introducing a foam strip between the respective rows of fillets at a point closely following the trailing end of each of said blocks whereby, as the rows converge, they are glued together with a foam strip between them; and a second stage of heater and gluing blocks similar to those in said first stage, the blocks in said second stage being interposed between all rows which were not glued by said first stage, thee being further means for introducing foam strips at points closely following the trailing ends of the blocks in said second stage whereby, upon leaving said second stage, said fillets are assembled into panels.

2. Apparatus for assembling rows of wood fillets into panels, said apparatus comprising:

feeder means for periodically advancing said rows step-wise for a distance which is substantially equal to a multiple of the length of each fillet, the fillets in adjacent rows being staggered lengthwise;

a first stage of wedge-shaped heater and gluing blocks, the blocks being transversally tapered along the direction of feed, the blocks being interposed between selected rows of said fillets with the fillets pressing laterally against the blocks, the length of each said heater being at least twice the length of a fillet, thereby to pre-heat the edges of a plurality of fillets pressing against the block, said block having a glue port adjacent the trailing end of each side through which hot melt adhesive is applied to heated edges of fillets being driven past the block;

means for introducing a foam strip between the respective rows of fillets at a point closely following the trailing end of each of said blocks whereby, as the rows converge, they are glued together with a foam strip between them; and a second stage of heater and gluing blocks similar to those in said first stage, the blocks in said second stage being interposed between all rows which were not glued by said first stage, there being further means for introducing foam strips at points closely following the trailing ends of the blocks in said second stage whereby, upon leaving said second stage, said fillets are assembled into panels.

3. Apparatus as set forth in claim 2 wherein said foam strip is polyethylene.

4. Apparatus as set forth in claim 2 wherein said feeder means comprise:

a pusher plate slidable in the direction of feed;

means for reciprocating said plate over a distance corresponding to a multiple of the length of each fillet;

mounted on said plate, a series of raised pusher bars one for each row, the bars being staggered along the direction of feed by approximately half the length of a fillet;

said pusher bars being operative, during a forward stroke of said pusher plate, to advance a set of fillets in the paths of the pusher bars;

means for frictionally feeding rows of fillets onto said pusher plate at a level slightly above said pusher bars; and means operative at the completion of a return stroke of said pusher plate for driving a next set of fillets down into the path of said pusher bars.

5. Apparatus for assembling rows of elongate, thin wood fillets into panels, said apparatus comprising:

a pusher plate slidable in the direction of feed;

means for reciprocating said plate over a distance corresponding to a multiple of the length of each fillet;

mounted on said plate, a series of raised pusher bars one for each row, the bars being staggered along the direction of feed by approximately half the length of a fillet;

said pusher bars being operative, during a forward stroke of said pusher plate, to advance a set of fillets in the paths of the pusher bars;

means for frictionally feeding rows of fillets onto said pusher plate at a level slightly above said pusher bars;

means operative at the completion of a return stroke of said pusher plate for driving a next set of fillets down into the path, of said pusher bars;

a first stage of wedge-shaped heater and gluing blocks, the blocks being transversally tapered along the direction of feed, the blocks being interposed between selected rows of said fillets with the fillets pressing laterally against the blocks, the length of each said heater being at least a multiple of the length of a fillet thereby to pre-heat the edges of a plurality of fillets pressing against each side of the block, each said block having a glue port adjacent the trailing end of each side through which hot melt adhesive is applied to heated edges of fillets being driven past the block;

means for introducing a polyethylene foam strip between the respective rows of fillets at a point closely following the trailing end of each of said blocks whereby, as the rows converge, they are glued together with a foam strip between them; and a second stage of heater and gluing blocks similar to those in said first stage, the blocks in said second stage being interposed between all rows which were not glued by said first stage, there being further means for introducing polyethylene foam strips at points closely following the trailing ends of the blocks in said second stage whereby, upon leaving said second stage, said fillets are assembled into panels.

* * * * *